(12) United States Patent
El Markhi et al.

(10) Patent No.: US 11,695,283 B2
(45) Date of Patent: Jul. 4, 2023

(54) SHOOT-THROUGH CURRENT LIMITING CIRCUIT

(71) Applicant: TEXAS INSTRUMENTS INCORPORATED, Dallas, TX (US)

(72) Inventors: Mustapha El Markhi, Richardson, TX (US); Alejandro Vera, Wylie, TX (US); Tonmoy Roy, Dallas, TX (US); Rohit Bhan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 619 days.

(21) Appl. No.: 16/277,548

(22) Filed: Feb. 15, 2019

(65) Prior Publication Data

US 2019/0348846 A1  Nov. 14, 2019

Related U.S. Application Data

(60) Provisional application No. 62/670,287, filed on May 11, 2018.

(51) Int. Cl.
*H02J 7/00* (2006.01)

(52) U.S. Cl.
CPC .............. *H02J 7/0031* (2013.01); *H02J 7/00* (2013.01); *H02J 7/00302* (2020.01); *H02J 7/00304* (2020.01)

(58) Field of Classification Search
CPC ........ H02J 7/0031; H02J 7/00; H02J 7/00302; H02J 7/00304; H02J 7/0032
USPC ........................................................ 320/137
See application file for complete search history.

(56) References Cited

U.S. PATENT DOCUMENTS

| | | | | |
|---|---|---|---|---|
| 3,582,758 A | * | 6/1971 | Gunn ................... | H02M 7/2173 363/127 |
| 3,835,945 A | * | 9/1974 | Yamanaka ........... | G01G 19/024 177/134 |
| 4,016,426 A | * | 4/1977 | Nishioka ............. | B60R 21/0176 307/10.1 |
| 4,019,474 A | * | 4/1977 | Nishimiya ............ | F02D 41/148 123/694 |
| 4,066,968 A | * | 1/1978 | Guipaud ............... | F02P 5/1556 307/650 |
| 4,272,716 A | * | 6/1981 | Etienne ................ | G01R 31/382 320/130 |

(Continued)

*Primary Examiner* — Richard Isla
*Assistant Examiner* — Manuel Hernandez
(74) *Attorney, Agent, or Firm* — Ray A. King; Frank D. Cimino

(57) ABSTRACT

Aspects of the disclosure provide for a circuit. In at least some examples, the circuit includes a logic circuit, a first comparator, a second comparator, and an AND logic circuit. The logic circuit has an output and the first comparator has a first input coupled to an input voltage (VIN) pin, a second input configured to receive a Vin under voltage lockout (VINUVLO) threshold value, and an output. The second comparator has a first input coupled to a power middle (PMID) pin, a second input coupled to a battery pin, and an output and the AND logic circuit has a first input coupled to the output of the logic circuit, a second input coupled to the output of the first comparator, a third input coupled to the output of the second comparator, and an output coupled to an input of a field-effect transistor (FET) control circuit.

18 Claims, 3 Drawing Sheets

(56) References Cited

U.S. PATENT DOCUMENTS

| | | | | |
|---|---|---|---|---|
| 4,288,780 A * | 9/1981 | Theodoru | E05B 49/006 | 382/182 |
| 4,352,094 A * | 9/1982 | Reneric | G01R 29/00 | 341/118 |
| 4,825,170 A * | 4/1989 | Champlin | G01R 31/389 | 324/436 |
| 4,862,071 A * | 8/1989 | Sato | G01R 19/16557 | 324/73.1 |
| 4,881,038 A * | 11/1989 | Champlin | G01R 31/389 | 324/426 |
| 5,488,283 A * | 1/1996 | Dougherty | H01M 10/44 | 320/145 |
| 5,554,919 A * | 9/1996 | Uchida | H01M 10/44 | 320/132 |
| 5,789,902 A * | 8/1998 | Abe | H02J 7/0031 | 320/134 |
| 6,160,381 A * | 12/2000 | Peterzell | H02H 3/12 | 320/134 |
| 6,225,842 B1 * | 5/2001 | Fujita | H02J 7/0047 | 327/135 |
| 6,243,277 B1 * | 6/2001 | Sun | H02M 1/14 | 323/222 |
| 6,326,771 B1 * | 12/2001 | Popescu-Stanesti | H02J 7/0068 | 320/139 |
| 7,030,596 B1 * | 4/2006 | Salerno | H02M 3/158 | 323/282 |
| 8,971,060 B2 * | 3/2015 | Wu | H02M 3/33523 | 363/21.12 |
| 9,312,776 B2 * | 4/2016 | Freeman | H03M 1/12 | |
| 10,931,099 B1 * | 2/2021 | Flor | B60R 16/033 | |
| 2003/0034764 A1 * | 2/2003 | Yang | H02M 3/33507 | 323/283 |
| 2005/0105311 A1 * | 5/2005 | Soldano | H02M 7/219 | 363/89 |
| 2006/0082346 A1 * | 4/2006 | Nagasawa | H02J 7/0029 | 320/150 |
| 2007/0210758 A1 * | 9/2007 | Gangstoe | H02J 7/0031 | 320/134 |
| 2007/0268080 A1 * | 11/2007 | Takeuchi | H03K 3/0231 | 331/1 A |
| 2008/0116851 A1 * | 5/2008 | Mori | H01M 10/443 | 320/134 |
| 2008/0310194 A1 * | 12/2008 | Huang | H02M 3/33507 | 363/21.18 |
| 2009/0167410 A1 * | 7/2009 | Yoshikawa | H03K 17/693 | 327/427 |
| 2009/0237059 A1 * | 9/2009 | Chiba | H02M 3/1588 | 323/288 |
| 2009/0309559 A1 * | 12/2009 | Xia | H02M 3/1588 | 323/265 |
| 2010/0164579 A1 * | 7/2010 | Acatrinei | H02M 1/4208 | 327/172 |
| 2011/0273804 A1 * | 11/2011 | Ikeuchi | H02J 7/0031 | 361/63 |
| 2011/0279101 A1 * | 11/2011 | Sasaki | H02M 1/32 | 323/271 |
| 2012/0091812 A1 * | 4/2012 | Lin | H02J 7/0068 | 307/66 |
| 2012/0112755 A1 * | 5/2012 | Nishizawa | G01R 31/3835 | 324/433 |
| 2012/0169116 A1 * | 7/2012 | Graf | B60R 16/03 | 307/10.7 |
| 2013/0033108 A1 * | 2/2013 | Hidaka | H02J 1/108 | 307/51 |
| 2013/0169258 A1 * | 7/2013 | Lai | H02M 3/1582 | 323/311 |
| 2014/0070618 A1 * | 3/2014 | Bajaj | H02J 7/00 | 307/66 |
| 2014/0111015 A1 * | 4/2014 | Fall | H02J 7/0063 | 307/66 |
| 2014/0233776 A1 * | 8/2014 | Krogsgaard | H04R 1/1025 | 381/323 |
| 2014/0266323 A1 * | 9/2014 | McIntosh | H02M 1/08 | 327/109 |
| 2014/0375291 A1 * | 12/2014 | Tomasz | H02J 7/345 | 323/282 |
| 2015/0002161 A1 * | 1/2015 | Abdullah | G06F 1/3212 | 324/433 |
| 2015/0207425 A1 * | 7/2015 | Sasaki | H02M 3/158 | 363/17 |
| 2015/0280473 A1 * | 10/2015 | Zhao | H02J 7/00 | 320/107 |
| 2015/0311735 A1 * | 10/2015 | Shimada | H02H 7/18 | 320/107 |
| 2016/0072322 A1 * | 3/2016 | Yoshimatsu | H02J 7/00308 | 361/86 |
| 2016/0116925 A1 * | 4/2016 | Freeman | H02M 3/33515 | 307/130 |
| 2017/0169788 A1 * | 6/2017 | Kim | G09G 3/3696 | |
| 2017/0294772 A1 * | 10/2017 | Illing | H02H 9/025 | |
| 2018/0048232 A1 * | 2/2018 | Adell | H02M 3/1563 | |
| 2018/0226894 A1 * | 8/2018 | Teo | H02M 3/335 | |
| 2019/0115841 A1 * | 4/2019 | Maruyama | H02M 3/156 | |
| 2020/0036293 A1 * | 1/2020 | Kannan | H02M 1/08 | |
| 2021/0225236 A1 * | 7/2021 | Zhu | G09G 3/20 | |

* cited by examiner

SHOOT-THROUGH CURRENT LIMITING CIRCUIT

CROSS-REFERENCE TO RELATED APPLICATIONS

The present application claims priority to U.S. Provisional Patent Application No. 62/670,287, which was filed May 11, 2018, is titled "Shoot-Through Current Control When Entering Ship Mode In Battery Charger Device," and is hereby incorporated herein by reference in its entirety.

BACKGROUND

When electronic devices are in a low-power or ship mode, the devices consume a limited amount of power. The limited amount of power is sometimes referred to as a standby power and a current consumed as a component of the standby power can be referred to as a standby current. A standby current is, in at least some examples, in a nano-ampere (nA) range or less. To achieve the low standby current, in some examples, a majority of components in the electronic device are turned off (e.g., transistors controlled to be in non-conductive states, etc.). However, in some circumstances a rapid turn-off of components of a device after a substantial amount of current has been flowing in the device can cause shoot-through current to flow in the device.

SUMMARY

Aspects of the disclosure provide for a circuit. In at least some examples, the circuit includes a logic circuit, a first comparator, a second comparator, and an AND logic circuit. The logic circuit has an output and the first comparator has a first input coupled to an input voltage (VIN) pin, a second input configured to receive a Vin under voltage lockout (VINUVLO) threshold value, and an output. The second comparator has a first input coupled to a power middle (PMID) pin, a second input coupled to a battery pin, and an output and the AND logic circuit has a first input coupled to the output of the logic circuit, a second input coupled to the output of the first comparator, a third input coupled to the output of the second comparator, and an output coupled to an input of a field-effect transistor (FET) control circuit.

Other aspects of the disclosure provide for a circuit. In at least some examples, the circuit includes a logic circuit, a first comparator, a second comparator, and an AND logic circuit. The logic circuit has an output and is configured to assert a SHIP_MODE_REQ signal as a logical high value to request entry of the circuit into a ship mode. The first comparator has a first input coupled to a VIN pin, a second input configured to receive a VINUVLO threshold value, and an output, the first comparator configured to assert a VINUVLO_COMP signal as a logical high value when a value received at the first input of the comparator is less than a value received at the second input of the comparator. The second comparator has a first input coupled to a PMID pin, a second input coupled to a battery pin, and an output, the second comparator configured to assert a SUPP_COMP signal as a logical high value when a value received at the first input of the comparator is less than a value received at the second input of the comparator. The AND logic circuit has a first input coupled to the output of the logic circuit, a second input coupled to the output of the first comparator, a third input coupled to the output of the second comparator, and an output coupled to an input of a FET control circuit, the AND logic circuit configured to assert a SHIP_MODE_ENABLE signal as a logical high value when SHIP_MODE_REQ, VINUVLO_COMP, and SUPP_COMP are each the logical high values.

Other aspects of the disclosure provide for a system. In at least some examples, the system includes a battery charging circuit, a battery, and a load. The battery charging circuit includes, for example, a first transistor, a second transistor, a transistor control circuit, and a control circuit. The first transistor has a gate terminal, a source terminal coupled to a first node configured to receive an input voltage, and a drain terminal coupled to a second node. The second transistor has a gate terminal, a source terminal coupled to the second node, and a drain terminal coupled to a third node. The transistor control circuit is coupled to the gate terminal of the first transistor and the second transistor. The control circuit includes, for example, a logic circuit, a first comparator, a second comparator, and an AND logic circuit. The logic circuit has an output and the first comparator has a first input coupled to the first node, a second input configured to receive a threshold value, and an output. The second comparator has a first input coupled to the second node, a second input coupled to the third node, and an output and the AND logic circuit has a first input coupled to the output of the logic circuit, a second input coupled to the output of the first comparator, a third input coupled to the output of the second comparator, and an output coupled to an input of the transistor control circuit. The battery is coupled to the third node. The load is coupled to the second node and has a capacitance that corresponds to a non-zero amount of charge stored by the load when the load receives power via the battery charging circuit.

BRIEF DESCRIPTION OF THE DRAWINGS

For a detailed description of various examples, reference will now be made to the accompanying drawings in which.

DETAILED DESCRIPTION

Figure 1:
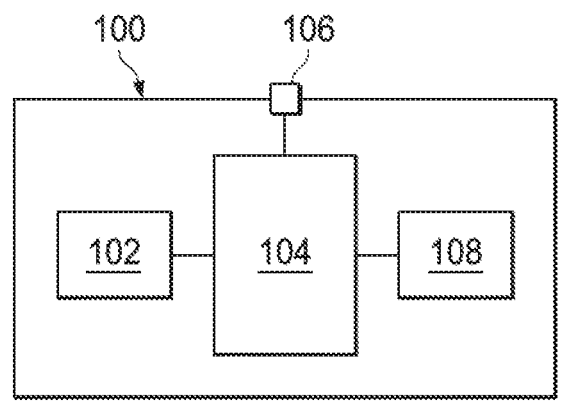
FIG. 1 shows a block diagram of an illustrative system in accordance with various examples.

From the perspective of a battery charging circuit that includes conductive paths between an input voltage (Vin) terminal and a load (e.g., via a power middle (PMID) terminal), between the Vin terminal and a battery terminal, and between the load and the battery terminal, if the load has capacitance such that a charge stored by the load the shoot-through current can occur. For example, the capacitance of the load creates a signal present at the PMID terminal that has a voltage sufficiently larger than a voltage present at the battery terminal (e.g., such as 200 milivolts (mV), or more, greater than the voltage present at the battery terminal). When components of the battery charging circuit are turned-off as the device enters the ship mode, the battery charging circuit can experience the shoot-through current flowing from the load to the battery terminal because of the value of the signal present at the PMID terminal compared to the voltage present at the battery terminal. The shoot-through current flows through the battery charging circuit despite the majority of components of the battery charging circuit being turned off, in some examples, by flowing through body diodes (e.g., parasitic diodes) of transistors that are otherwise being controlled to be turned-off and in a non-conductive state at that time. The shoot-through current can, in at least some examples, damage a battery coupled to the battery terminal, such as by over-charging the battery. In some circumstances, the damage can create a risk of injury for a user and/or other unsafe conditions, such as by increasing a risk of fire and/or explosion of the battery due to the shoot-through current.

At least some aspects of the present disclosure provide for a battery charging circuit that includes circuitry configured to at least partially mitigate shoot-through current in the battery charging circuit. Alternatively, in some examples a power management circuit includes the battery charging circuit and circuitry configured to at least partially mitigate shoot-through current through the power management circuit. In at least some examples, the circuitry determines whether a voltage present at the PMID terminal is less than a supplemental voltage threshold (VSUPP) as one of a plurality of requisite conditions for entering the ship mode. Based on a result of that determination, as well as receipt of a ship mode enable signal and a determination that Vin is less than a Vin under voltage lockout (VINUVLO) threshold, the circuitry outputs a controls signal to enable the ship mode. The VINUVLO threshold is, in some examples, about 3.4 volts (V), while in other examples the VINUVLO threshold is predetermined or calculated to be any suitable value and according to any suitable criteria. In at least some examples, VSUPP is determined at least partially according to a voltage of the battery (VBATT). For example, VSUPP may be approximately equal to VBATT, while in other examples VSUPP may be less than VBATT.

Turning now to FIG. 1, a block diagram of an illustrative system 100 is shown. In at least some examples, the system 100 is representative of a consumer or other electronic device, such as a wearable device (e.g., a headset, earbuds, hearing aids, smart watches, fitness accessories, patient monitors, etc.), a smartphone, a laptop computer, a notebook or netbook computer, a tablet device, a power tool, or any other device that is at least partially powered by a rechargeable battery. In at least some examples, the rechargeable battery is configured to be recharged within the system 100. In various examples, the system 100 includes a battery 102, a battery charging circuit 104, a charging port 106, and a load 108. The battery 102 is any suitable type of battery that is capable of providing power to components of the system 100, such as at least the load 108, and in some circumstances, the battery charging circuit 104 and/or the charging port 106 (e.g., such as in a circumstance in which power is provided from the battery 102 to a device (not shown) coupled to the charging port 106 to charge and/or power the device coupled to the charging port 106). In at least one example, the battery charging circuit 104 is a controller that controls all, or substantially all, aspects of charging of the battery 102 and/or performs power management functions for the system 100. In other examples, the battery charging circuit 104 is a shoot-through current mitigation circuit, configured to mitigate shoot-through current flowing out of the load 108 through the battery charging circuit 104 to the battery 102, as discussed herein. In yet other examples, the battery charging circuit 104 comprises the shoot-through current mitigation circuit in addition to other components related to charging of the battery 102. In an example, the battery charging circuit 104 is a single chip housed inside a package. In another example, the battery charging circuit 104 includes circuitry distributed across multiple chips, with all such chips housed inside a single package. In yet other examples, various packages housing chips are coupled together to create the functionality of the battery charging circuit 104.

The battery charging circuit 104 is coupled to the charging port 106, to which a power supply (not shown) couples to provide power (e.g., mains power) to the system 100. For example, the charging port 106 is suitable for connection by a user to mains power via an adapter (not shown) or to a device for powering the device, as discussed above. The system 100 is merely an example system in which the battery charging circuit 104 can be implemented. Other systems or devices that use rechargeable and/or non-rechargeable batteries will also find benefit with the battery charging circuit 104.

In at least one example of operation, the battery charging circuit 104 receives power via the charging port 106 and uses the power to charge the battery 102. In various other examples, the battery charging circuit 104 provides the received power to the load 108 for powering the load 108, provides power from the battery 102 to the load 108 for powering the load 108, and/or provides power from the battery 102 to the charging port 106 to power a device coupled to the charging port 106 to charge the device coupled to the charging port 106.

In some examples, the battery charging circuit 104 additionally implements the techniques alluded to above and described in greater detail below to enable a ship mode for the system 100, in which the system 100 draws a minimal amount of current (e.g., a standby current). The ship mode is enabled, in some example, at least partially according to a determination that a voltage present at the load 108 (e.g., at a PMID terminal (not shown) of the battery charging circuit 104 to which the load 108 couples) is less than VSUPP, which is based at least partially on VBATT. As explained herein, these techniques are, in some examples, helpful in preventing potentially volatile conditions of the battery 102 caused by shoot-through current passing from the load 108 to the battery 102 when ship mode is enabled for the system 100, at least partially mitigating risk of damage to the system 100, unsafe conditions related to the system 100, and/or injury to a user of the system 100.

Figure 2:
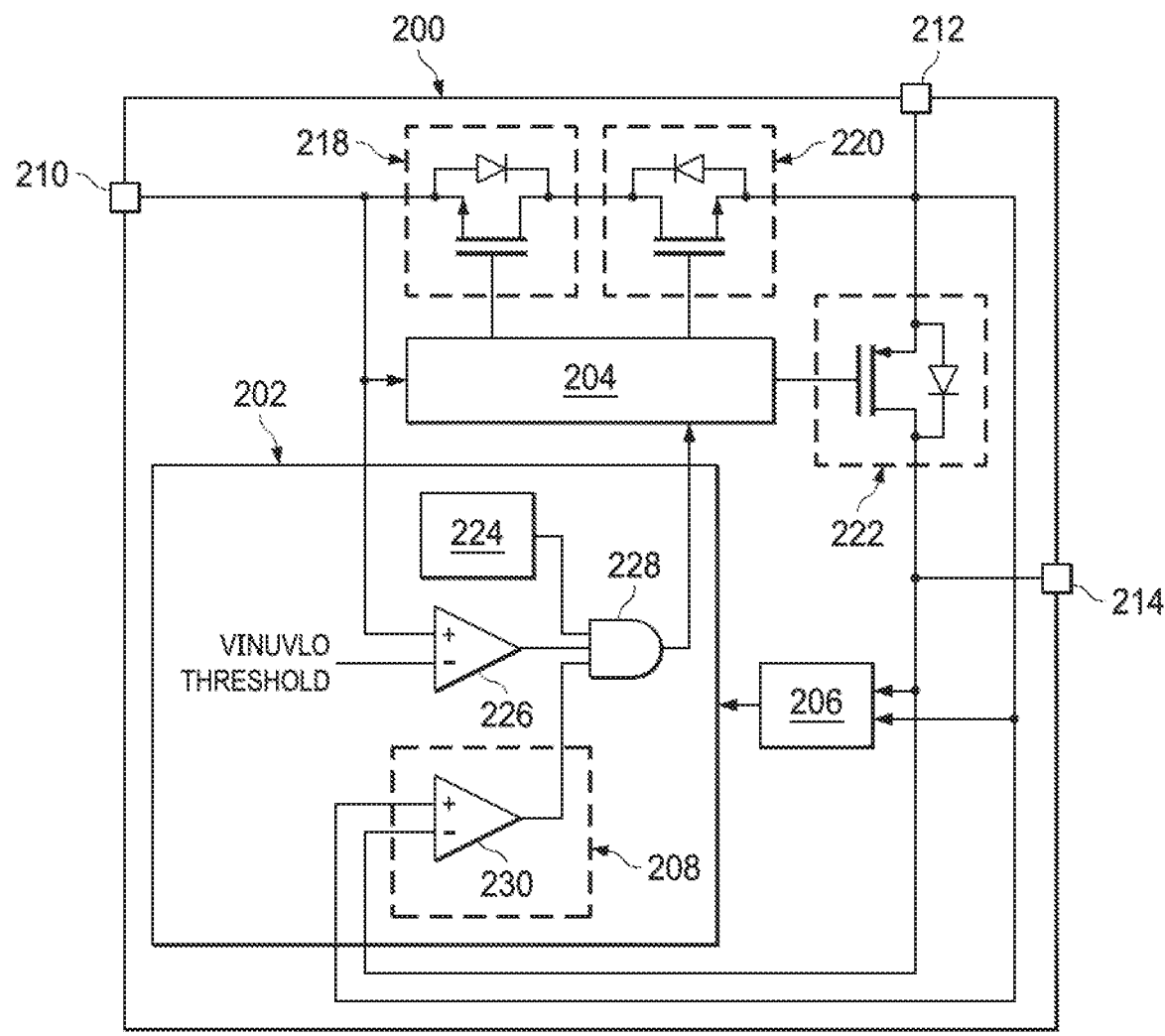
FIG. 2 shows a block diagram of an illustrative circuit in accordance with various examples.

Turning now to FIG. 2, a block diagram of an illustrative circuit 200 is shown. In at least some examples, the circuit 200 is suitable for implementation as the battery charging circuit 104 of the system 100 of FIG. 1. For example, the circuit 200 may be an integrated battery charge management circuit that integrates a plurality of charge management and/or control circuits into a single chip and/or package. In at least one example, the circuit 200 includes a control circuit 202, a field-effect transistor (FET) control circuit 204, and an analog-to-digital converter (ADC) 206. The control circuit 202, in addition to including other components and/or circuits not shown, includes at least a shoot-through current mitigation circuit 208. The shoot-through current mitigation circuit 208, in at least some examples, provides an advantage of preventing shoot-through current flowing from a load to a battery when a device including, or coupled to, the load and the battery are placed in a ship or low-current mode of operation.

The circuit 200 further includes a plurality of external pins (e.g., pins that will be exposed via leads, pads, or other electrically conductive structures, to an outside world outside of a package that houses the circuit 200) including at least a voltage input (Vin) pin 210, a PMID pin 212, and a battery pin 214. In various examples, the circuit 200 further includes a transistor 218, a transistor 220, and a transistor 222 (e.g., such as FETs) configured to function as switches to control the flow of current through at least a portion of the circuit 200. In at least some examples, while the transistor 218, the transistor 220, and the transistor 222 are each illustrated as single transistors, in implementation any of the transistor 218, the transistor 220, and/or the transistor 222 may instead be implemented as a plurality of transistors in parallel (e.g., such that an amount of current passing from a net at which the drain terminals of the parallel combination of transistors are coupled to a net at which the source terminals of the parallel combination of transistors are coupled increases with the number of parallel transistors turned on or operating in a conductive state and decreases with the number of parallel transistors turned off or operating in a non-conductive state. Additionally, in at least some examples each of the transistor 218 and the transistor 220 are n-type FETS (nFETs) and the transistor 222 is a p-type FET (pFET), such as is illustrated in FIG. 2, while in other examples the circuit of FIG. 2 is reconfigurable such that one or more of the transistor 218, the transistor 220, or the transistor 222 are instead implemented according to other process technologies. Additionally, in at least some examples, one of the transistor 218 or the transistor 220 may be omitted from the circuit 200.

In at least some examples, each of the transistor 218, the transistor 220, and the transistor 222 includes a parasitic or body diode having an anode coupled to a source terminal of the respective transistor and a cathode coupled to a body diode of the respective transistor. Under certain conditions when a value of a voltage present at the source terminal of the transistor 218, the transistor 220, or the transistor 222 is sufficiently greater than a value of a voltage present at the drain terminal of the respective transistor 218, transistor 220, or transistor 222, in some examples the body diode of the respective transistor 218, transistor 220, or transistor 222 creates a path for current to flow despite the transistor 218, transistor 220, or transistor 222 being in a non-conductive state.

In at least some examples, the control circuit 202 includes the shoot-through current mitigation circuit 208, as discussed above, a logic circuit 224, a comparator 226, and an AND logic circuit 228. The logic circuit 224 is any digital or analog component or group of components capable of receiving one or more inputs, performing one or more processing or logical operations based at least partially on the received inputs, and outputting one or more output signals resulting from the processing or logical operations. In some examples, the logic circuit 224 is a stand-alone component, while in other examples the logic circuit 224 is representative of a portion of a larger component or device. The AND logic circuit 228 is any digital and/or analog component or components capable of receiving a plurality of inputs and outputting a signal representing a result of a logical AND operation performed on the plurality of received inputs. The shoot-through current mitigation circuit 208 includes, or is implemented as, in at least one example, a comparator 230. In some examples, the shoot-through current mitigation circuit 208 further includes other circuitry and/or components not shown but configured to advantageously interact with the shoot-through current mitigation circuit 208 in providing the functionality taught herein. While some illustrative components and/or pins of the circuit 200 are illustrated and discussed herein, in various implementations the circuit 200 can include additional components and/or pins that are not shown, and the components discussed herein may provide additional functionality not discussed herein. For example, in at least some architectures the control circuit 202 further includes, although not shown, digital logic and/or other decision making or processing circuitry and one or more registers and/or other data storage circuitry.

In at least one example, the control circuit 202 is coupled to the FET control circuit 204, the ADC 206, the Vin pin 210, the PMID pin 212, and the battery pin 214. The FET control circuit 204 is coupled to the Vin pin 210, the battery pin 214, the transistor 218, and the transistor 220. The ADC 206 is coupled to the Vin pin 210, the PMID pin 212, and the battery pin 214. The transistor 218 has a gate terminal coupled to the FET control circuit 204, a source terminal coupled to the Vin pin 210, and a drain terminal. The transistor 220 has a gate terminal coupled to the FET control circuit 204, a drain terminal coupled to the drain terminal of the transistor 218, and a source terminal coupled to the PMID pin 212. The transistor 222 has a gate terminal coupled to the FET control circuit 204, a source terminal coupled to the PMID pin 212, and a drain terminal coupled to the battery pin 214. A first input of the comparator 226 is coupled to the Vin pin 212 and a second input of the comparator 226 is configured to receive a VINUVLO threshold signal. The VINUVLO threshold signal is, in some examples, generated based at least partially on Vin by another component (not shown) of the control circuit 202 or the circuit 200, such as a bandgap reference generation circuit. A first input of the comparator 230 is coupled to the PMID pin 212 and a second input of the comparator 230 is coupled to the battery pin 214. An output of the logic circuit 224, an output of the comparator 226, and an output of the comparator 230 are each coupled to respective inputs of the AND logic circuit 228 and an output of the AND logic circuit 228 is coupled to the FET control circuit 204. In some examples, the output of the comparator 230 is also coupled to the FET control circuit 204.

In an example of operation, the circuit 200 is configured to receive an input voltage and control charging of a battery (e.g., as would be coupled to the circuit 200 at the battery pin 214). In at least some examples, the circuit 200 further controls providing of power from the battery pin 214 to the PMID pin 212, from the battery pin 214 to the Vin pin 210, and/or providing of power from the Vin pin 210 to the PMID pin 212. In at least some examples, more than one coupling occurs at a time, for example, such that the Vin pin 210 is coupled to the PMID pin 212 while power is also provided to the battery pin 214 by coupling the Vin pin 210 to the battery pin 214 for charging a battery coupled to the battery pin 214. The control circuit 202, in some examples, is configured to monitor one or more conditions related to charging of a battery coupled to the battery pin 214 and control the charging of the battery coupled to the battery pin 214. In some examples, ADC 206 is configured to measure and convert one or more signals present in the circuit 200 and provide a digital output of that measurement and conversion to the control circuit 202 and/or another unshown component for use in charging of the battery coupled to the battery pin 214, providing of power to the PMID pin 212, or any other suitable purpose. In some examples, the control circuit 202 is further configured to monitor one or more conditions related to providing power to a load coupled to the PMID pin 212 and control the providing of power to the PMID pin 212. In at least some examples, when the control circuit 202 receives an instruction to put the circuit 200 into a ship mode or other low-power mode (e.g., such as a battery saving mode), or the control circuit 202 determines that the circuit 200 should enter the ship mode to protect the circuit

200, a load coupled to the PMID pin 212, a battery coupled to the battery pin 214, or a device that contains the circuit 200, the logic circuit 224 outputs a signal (SHIP_MO-DE_REQ) having a logical high value and outputs SHIP_MODE_REQ having a logical low value for all other times. In various examples, the logic circuit 224 is configured to output SHIP_MODE_REQ after receiving a request (e.g., such as via an inter-integrated circuit ($I^2C$) interface) or detection of a physical input (e.g., a long press, such as greater than about 4 seconds, of a button, etc.).

Although entry into the ship mode has been requested, in at least some examples the existence of certain conditions within the circuit 200 are further prerequisites to entry into the ship mode. For example, entry into the ship mode additionally requires that Vin to be less than the VINUVLO threshold and a voltage present at the PMID pin 212 be less than VSUPP, which is determined according to VBATT (either by using VBATT directly after processing, such as by a buffer). When Vin is less than the VINUVLO threshold, the comparator 226 outputs a signal (VINUVLO_COMP) having a logical high value and outputs VINUVLO_COMP having a logical low value when Vin is not less than the VINUVLO threshold. Similarly, when the voltage present at the PMID pin 212 (VPMID) is less than VSUPP (and therefore less than VBATT), the comparator 230 outputs a signal (SUPP_COMP) having a logical high value and outputs SUPP_COMP having a logical low value when VPMID is not less than VSUPP. When SHIP_MODE_REQ, VINUVLO_COMP, and SUPP_COMP each have logical high values, the AND logic circuit 228 outputs a signal (SHIP_MODE_ENABLE) having a logical high value and outputs SHIP_MODE_ENABLE having a logical low value when any one or more of SHIP_MODE_REQ, VINUVLO_COMP, or SUPP_COMP does not have a logical high value.

Based on SHIP_MODE_ENABLE, the FET control circuit 204 turns off the transistor 218, the transistor 220, and the transistor 222, placing each of the transistor 218, the transistor 220, and the transistor 222 in a non-conductive state. As a result of the comparison performed by the comparator 230, shoot-through current passing from the PMID pin 212 to the battery pin 214 is at least partially mitigated because a voltage difference between VPMID and VBATT is insufficient to cause the body diodes of the transistor 222 to begin conducting, causing an unintended and/or undesirable electrically conductive path between the PMID pin 212 and the battery pin 214. In the absence of the shoot-through current mitigation circuit 208 (and therefore absence of SUPP_COMP), in at least some examples, when SHIP_MODE_ENABLE and VPMID is greater than VBATT, current flows from the PMID pin 212 to the battery pin 214, potentially damaging and/or creating unsafe conditions related to a battery coupled to the battery pin 214. As such, in at least some examples the shoot-through current mitigation circuit 208, generation of SUPP_COMP, and consideration of SUPP_COMP in generation of SHIP_MODE_ENABLE increases reliability and longevity of a battery coupled to the battery pin 214 and/or a system containing the circuit 200 and increases safety of a device containing the circuit 200 and coupled to a battery at the battery pin 214.

Figure 3:
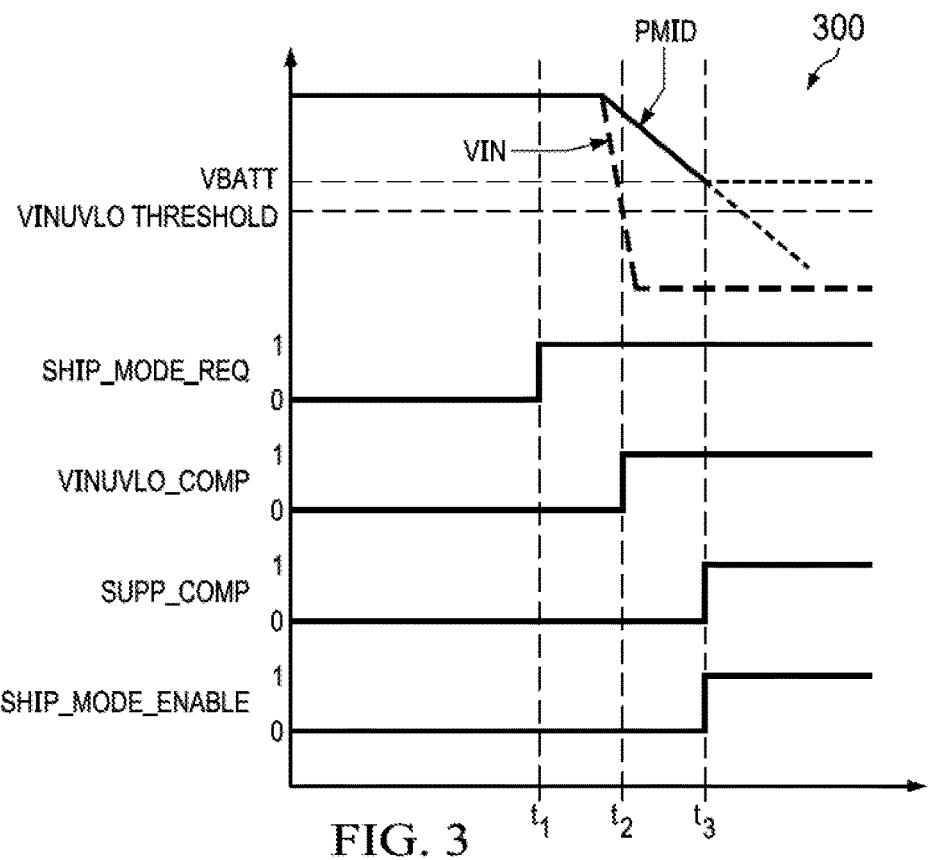
FIG. 3 shows a diagram of illustrative signals in accordance with various examples.

Turning now to FIG. 3, a diagram 300 of illustrative signals of a circuit is shown. For example, the diagram 300 is representative of at least some signals present in some implementations of the circuit 200 of FIG. 2. For example, the diagram 300 is representative of signals present in the circuit 200 when VINUVLO_COMP is asserted prior to SUPP_COMP being asserted. As shown in FIG. 3, at a time t1, SHIP_MODE_REQ transitions from a logical low value to a logical high value, corresponding to a request to put the circuit 200 into a ship mode. At a time t2, VIN becomes less than the VINUVLO threshold and VINUVLO_COMP transitions to a logical high value, however SHIP_MODE_EN-ABLE is not yet asserted. Only after both SHIP_MO-DE_REQ and VINUVLO_COMP have logical high values and VPMID falls at time t3 below VBATT does SUPP_COMP transition to a logical high value, permitting assertion of SHIP_MODE_ENABLE as a logical high signal to transition the circuit 200 to the ship mode.

Figure 4:
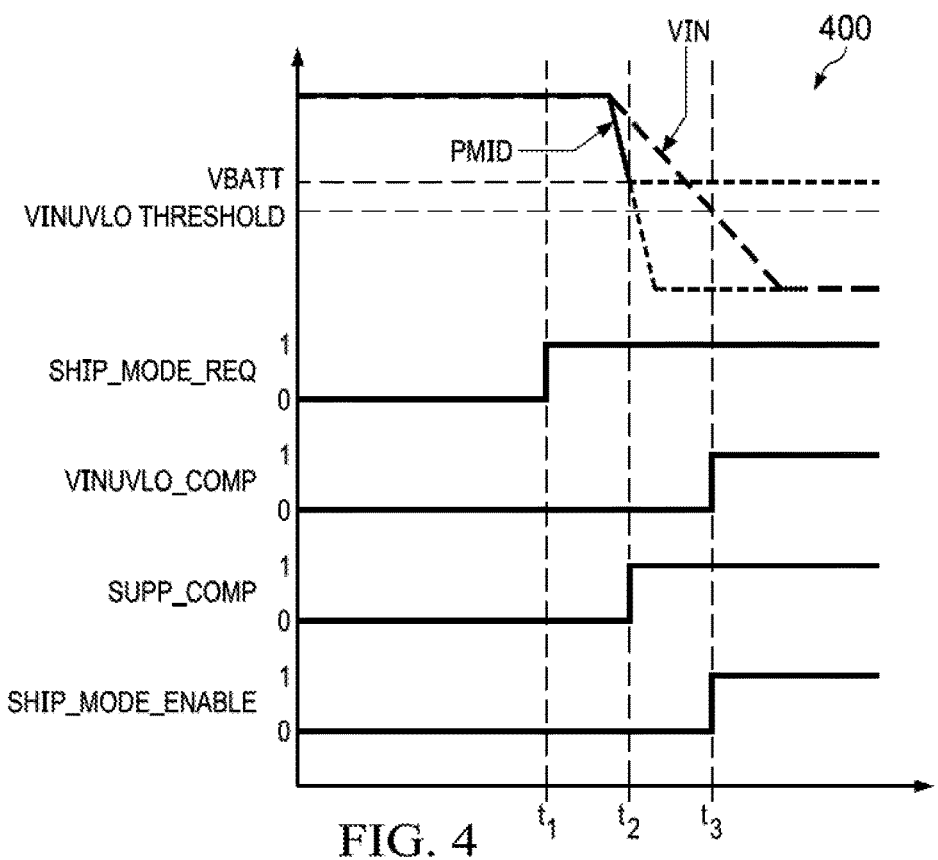
FIG. 4 shows a diagram of illustrative signals in accordance with various examples.

Turning now to FIG. 4, a diagram 400 of illustrative signals of a circuit is shown. For example, the diagram 400 is representative of at least some signals present in some implementations of the circuit 200 of FIG. 2. For example, the diagram 400 is representative of signals present in the circuit 200 when SUPP_COMP is asserted prior to VINUVLO being asserted. As shown in FIG. 4, at a time t1, SHIP_MODE_REQ transitions from a logical low value to a logical high value, corresponding to a request to put the circuit 200 into a ship mode. At a time t2, VPMID becomes less than VBATT and SUPP_COMP transitions to a logical high value, however SHIP_MODE_ENABLE is not yet asserted. Only after both SHIP_MODE_REQ and SUPP_COMP have logical high values and VIN falls at time t3 below the VINUVLO threshold does VINUVLO_COMP transition to a logical high value, permitting assertion of SHIP_MODE_ENABLE as a logical high signal to transition the circuit 200 to the ship mode.

Figure 5:
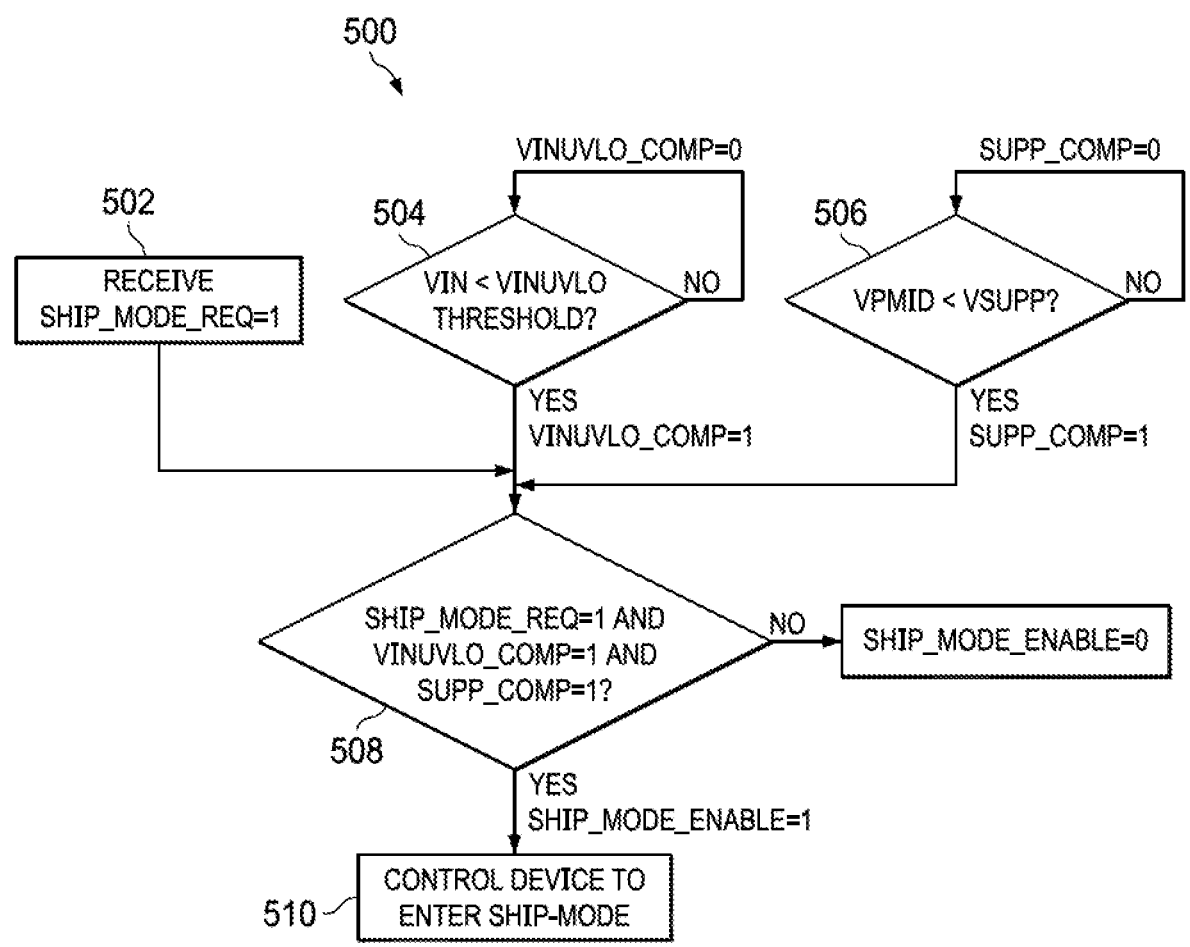
FIG. 5 shows a flowchart of an illustrative method in accordance with various examples.

Turning now to FIG. 5, a flowchart of an illustrative method 500 is shown. In at least some examples, the method 500 is representative of operation of, or suitable for implementation by, the battery charging circuit 104 and/or the circuit 200, individually or in combination. The method 500 is, in at least some examples, a method for controlling a device to enter a ship mode, as described herein.

At operation 502, a SHIP_MODE_REQ signal is received. The SHIP_MODE_REQ signal requests that the device be controlled to enter the ship mode, for example, by a power management or battery charging circuit electrically decoupling at least a portion of the device from a terminal at which Vin is received and/or from a battery of the device. In some examples, the device generates SHIP_MODE_REQ based on one or more conditions detected or determined by the device, while in other examples SHIP_MODE_REQ is a signal received from a user or generated based on input received from a user (e.g., user manipulation of an input component of the device causes generation of SHIP_MO-DE_REQ).

At operation 504, VIN is compared to a VINUVLO threshold. When VIN is less than the VINUVLO threshold, VINUVLO_COMP is set to a logical high value. When VIN is not less than the VINUVLO threshold, VINUVLO_COMP is set to a logical low value.

At operation 506, VPMID is compared to VBATT (or a signal representative of VBATT, such as the output of a buffer configured to receive VBATT and output the signal representative of VBATT). When VPMID is less than VBATT, SUPP_COMP is set to a logical high value. When VPMID is not less than VBATT, SUPP_COMP is set to a logical low value. While operation 502, operation 504, and operation 506 are discussed herein linearly with operation 502 preceding operation 504, which itself precedes operation 506, in various examples operation 506 may precede operation 504 and/or operation 502, operation 504 may precede operation 502, or any one or more of operation 502, operation 504, and/or operation 506 may be performed substantially concurrently. As such, no order of occurrence of operation 502, operation 504, or operation 506 with respect to one another is limited herein.

At operation 508, values of the SHIP_MODE_REQ, VINUVLO_COMP, and SUPP_COMP are examined. When each of SHIP_MODE_REQ, VINUVLO_COMP, and SUPP_COMP having logical high values, SHIP_MODE_ENABLE is asserted as a logical high value. When any one or more of SHIP_MODE_REQ, VINUVLO_COMP, or SUPP_COMP does not have a logical high value, SHIP_MODE_ENABLE has a logical low signal.

At operation 510, when SHIP_MODE_ENABLE has a logical high value, the device is controlled to enter the ship mode by electrically decoupling at least a portion of the device from a terminal at which Vin is received and/or from a battery of the device. In at least some examples, this includes controlling one or more transistors to enter non-conductive states (e.g., where gate-to-source voltages of the transistors are insufficient to cause channels to form in the transistors to convey current between terminals of the transistors).

In the foregoing discussion, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., FET, metal oxide semiconductor FET (MOSFET), n-type, p-type, etc.), these components may be exchanged for components of other process technologies (e.g., replace FET and/or MOSFET with bi-polar junction transistor (BJT), replace n-type with p-type or vice versa, etc.) and reconfiguring circuits including the replaced components to provide desired functionality at least partially similar to functionality available prior to the component replacement. Components illustrated as resistors, unless otherwise stated, are generally representative of any one or more elements coupled in series and/or parallel to provide an amount of impedance represented by the illustrated resistor. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means +/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A circuit, comprising:
   a first logic circuit having a first logic output, wherein the first logic circuit is configured to provide a request signal at the first logic output;
   a first comparator having a first comparator output and first and second comparator inputs, wherein the first comparator input is coupled to an input voltage terminal, and the second comparator input is coupled to an input voltage under voltage lockout (VINUVLO) threshold terminal;
   a second comparator having a second comparator output and third and fourth comparator inputs, wherein the third comparator input is coupled to a power middle (PMID) terminal, and the fourth comparator input is coupled to a battery terminal; and
   a second logic circuit having a second logic output and first, second and third logic inputs, wherein the first logic input is coupled to the first logic output, the second logic input is coupled to the first comparator output, the third logic input is coupled to the second comparator output, wherein the second logic circuit is configured to provide a ship mode enable signal at the second logic output responsive to a signal at the first comparator output and a signal at the second comparator output each being asserted.

2. The circuit of claim 1, further comprising a buffer having a buffer input and a buffer output, wherein the buffer input is coupled to the battery terminal, and the buffer output is coupled to the fourth comparator input.

3. The circuit of claim 1, further comprising:
   a first n-type FET (nFET) having a first gate terminal and first and second current terminals, wherein the first gate terminal is coupled to a FET control circuit, and the first current terminal is coupled to the input voltage terminal; and
   a second nFET having a second gate terminal and third and fourth current terminals, wherein the second gate terminal is coupled to the FET control circuit, the third current terminal is coupled to the PMID terminal, and the fourth current terminal is coupled to the second current terminal.

4. The circuit of claim 3, wherein the FET control circuit is configured to control the first nFET and the second nFET responsive to the second logic output.

5. The circuit of claim 4, further comprising a p-type FET (pFET) having a third gate terminal and fifth and sixth current terminals, wherein the third gate terminal is coupled to the FET control circuit, the fifth current terminal is coupled to the PMID terminal, and the sixth current terminal is coupled to the battery terminal.

6. The circuit of claim 5, wherein the FET control circuit is configured to control the pFET responsive to the second logic output.

7. A circuit, comprising:
a logic circuit having an output, the logic circuit configured to assert a ship mode request signal as a specific logical value to request entry of the circuit into a ship mode;
a first comparator having a first input coupled to an input voltage pin, a second input configured to receive an input voltage under voltage lockout (VINUVLO) threshold value, and an output, the first comparator configured to assert a first comparison signal as the specific logical value when an input voltage is less than the VINUVLO threshold value;
a second comparator having a first input coupled to a power-middle (PMID) pin, a second input coupled to a battery pin, and an output, the second comparator configured to assert a second comparison signal as the specific logical value when a voltage at the PMID pin is less than a battery voltage at the battery pin; and
an AND logic circuit having a first input coupled to the output of the logic circuit, a second input coupled to the output of the first comparator, a third input coupled to the output of the second comparator, and an output adapted to be coupled to an input of a field-effect transistor (FET) control circuit, the AND logic circuit configured to assert a ship mode enable signal as the specific logical value when each of the ship mode request signal, the first comparison signal and the second comparison signal is the specific logical value.

8. The circuit of claim 7, further comprising the FET control circuit, wherein the FET control circuit controls the circuit to enter the ship mode when the ship mode enable signal has the specific logical value.

9. The circuit of claim 8, further comprising:
a first n-type FET (nFET) having a gate terminal coupled to the FET control circuit, a source terminal coupled to the input voltage pin, and a drain terminal;
a second nFET having a gate terminal coupled to the FET control circuit, a source terminal coupled to the PMID pin, and a drain terminal coupled to the drain terminal of the first nFET; and
a p-type FET (pFET) having a gate terminal coupled to the FET control circuit, a drain terminal coupled to the battery pin, and a source terminal coupled to the PMID pin,
wherein the FET control circuit controls the circuit to enter the ship mode by controlling the first nFET, the second nFET, and the pFET to be in electrically non-conductive states when the ship mode enable signal has the specific logical value.

10. The circuit of claim 7, further comprising a buffer having an input coupled to the battery pin and an output coupled to the second input of the second comparator.

11. The circuit of claim 7, wherein the output of the second comparator is further coupled to the FET control circuit.

12. The circuit of claim 7, wherein the second comparator prevents the circuit from entering the ship mode when a voltage differential between the voltage at the PMID pin and the battery voltage at the battery pin is greater than a forward bias threshold of a parasitic diode of at least one transistor coupled between the PMID pin and the battery pin.

13. A system, comprising:
a first transistor having a first control terminal and first and second current terminals, wherein the first current terminal is coupled to an input voltage terminal;
a second transistor having a second control terminal and third and fourth current terminals, wherein the fourth current terminal is coupled to the second current terminal;
a transistor control circuit having a transistor control input and first and second transistor control outputs, wherein the first and second transistor control outputs are coupled to the first and second control terminals, respectively;
a control circuit, comprising:
a first logic circuit configured to provide a ship mode request signal at a first logic output;
a first comparator having a first comparator output and first and second comparator inputs, wherein the first comparator input is coupled to the first current terminal, and the second comparator input is coupled to a threshold terminal;
a second comparator having a second comparator output and third and fourth comparator inputs, wherein the third comparator input is coupled to the third current terminal, and the fourth comparator input is coupled to a battery terminal; and
a second logic circuit having a second logic output and first, second and third logic inputs, wherein the first logic input is coupled to the first logic output, the second logic input is coupled to the first comparator output, the third logic input is coupled to the second comparator output, and the second logic output is coupled to the transistor control input; and
a battery coupled to the battery terminal;
wherein the second logic circuit is configured to provide a ship mode enable signal at the second logic output responsive to a signal at the first comparator output and a signal at the second comparator output each being asserted.

14. The system of claim 13, further comprising a buffer having a buffer input and a buffer output, wherein the buffer input is coupled to the battery terminal, and the buffer output is coupled to the fourth comparator input.

15. The system of claim 13, wherein the first comparator is configured to assert a logic high signal responsive to a voltage at the first comparator input being lower than a voltage at the second comparator input, and wherein the second comparator is configured to assert a logic high signal responsive to a voltage at the third comparator input being less than a voltage at the fourth comparator input.

16. The system of claim 13, wherein the first comparator input is coupled to a FET control circuit.

17. The system of claim 13, further comprising a load coupled to the third current terminal, wherein the load has a capacitance that stores charge when the load receives power via the system, and at least some of the charge stored by the load is discharged when entering a ship mode, and wherein the second comparator prevents the charge from discharging to the battery terminal.

18. The system of claim 13, wherein the second comparator prevents the system from entering a ship mode when a voltage differential between the second current terminal and the battery terminal is greater than a forward bias threshold of a parasitic diode of the second transistor.

\* \* \* \* \*